July 7, 1925.
F. D. FOWLER
CUSHION TIRE
Filed Dec. 5, 1923
1,544,639
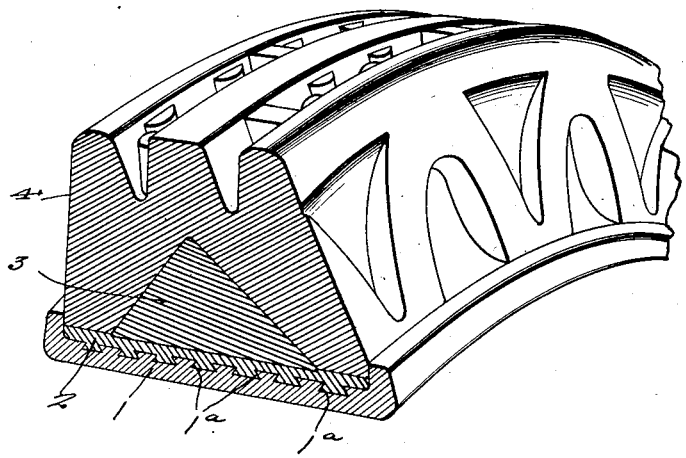
Inventor
Fred D. Fowler
By Spear, Middleton Donaldson, Hall
Attorney Patented July 7, 1925.

1,544,639

UNITED STATES PATENT OFFICE.

FRED D. FOWLER, OF WATERTOWN, MASSACHUSETTS, ASSIGNOR TO HOOD RUBBER COMPANY, OF WATERTOWN, MASSACHUSETTS, A CORPORATION OF MASSACHUSETTS.

CUSHION TIRE.

Application filed December 5, 1923. Serial No. 678,741.

*To all whom it may concern:*

Be it known that I, FRED D. FOWLER, a citizen of the United States, and resident of Watertown, in the county of Middlesex and State of Massachusetts, have invented certain new and useful Improvements in Cushion Tires, of which the following is a specification.

My present invention relates to improvements in cushion tires for motor vehicles, and is applicable more especially to solid rubber tires of the truck type wherein the rubber tire is secured by vulcanization to a carrying rim.

The invention aims to provide a tire which shall be highly resilient and yet capable of withstanding road wear to a greater degree than any tires of this type heretofore made, of which I am aware.

The invention further aims to provide a tire composed of rubber compounds having different qualities as to wear, which will be inseparable in use.

Yet another object is to provide a tire having a stronger union between the wear receiving portion and the hard rubber base.

With these several objects in view, the invention includes the novel construction hereinafter described and particularly defined in the appended claims.

An embodiment of my invention is shown in the accompanying drawing, in which—

The figure is a perspective view of a sufficient portion of a tire to illustrate its construction.

Referring by reference characters to this drawing, the numeral 1 designates the usual tire carrying rim and 2, the customary base of hard rubber compound, the rim having channels or recesses provided with overhanging edges to interlock with the hard rubber base, such as the dovetailed grooves 1ª shown, into which the hard rubber is forced in the manner well understood by those skilled in the art. The hard rubber base is used to secure a firm connection with the rim, it being impossible to otherwise secure relatively soft or cushion rubber directly to a metal surface.

The cushion tire proper comprises an inner portion or core 3, and an outer part or shell 4. The inner portion or core, is composed of a highly resilient rubber compound of relatively high heat conducting properties and of such compounding that it will cure in the same time, and under the same degree of heat, and with a homogeneous union, to both the hard rubber base and the outer shell.

The outside shell 4 is formed from a compound of higher tensile strength which will resist the cutting and grinding action of the roads in a manner not possible for soft cushion rubber of the character used for the core or inner portion 3. This outer shell is likewise compounded so as to cure in the same time and under the same degree of heat as the core and base.

By the use of a core or inner portion of high heat conductivity, I secure a stronger and more perfect union than would be possible if the body of the tire were made entirely of road resisting compound such as 4, besides getting increased resiliency.

Preferably, I make the inside core of triangular shape in cross section, which I have found by experience produces an extremely advantageous tire, as it has been demonstrated that under an 18% deflection in the height of the tire, there occurs but a 5% compression along the side of the triangle, which means that under normal load deflection, there is practically no strain tending to separate the compounds along the lines of union.

I have further found that a tire so constructed, has a cushioning effect or resiliency fully equal to any of the air core tires now on the market, and that the tire is free from any of the objectionable effects due to overhang of rubber over the center of the base, which is bound to occur in the air core type.

These results are accomplished without requiring any special base, my improved tire being adapted for use on the standard base or rim.

Having thus described my invention, what I claim is:—

1. A cushion tire comprising a hard rubber base, a triangular core of highly resilient rubber surmounting the same and vulcanized thereto, and a tread portion or shell of relatively tough wear resisting rubber enclosing the core and vulcanized to the core and base.

2. A cushion tire comprising a carrying rim having a hard rubber base, an outer portion or shell of relatively tough rubber resilient compound, said outer shell being of greater width than height, and converging upwardly to a substantially flat and relatively wide tread, and an inner core of relatively soft and more resilient rubber compound, said core being of triangular form with a relatively broad base resting on the hard rubber base, and being of a height which is not less than one half of height of the said outer portion, said core having its bottom vulcanized to the hard rubber base and said tread portion being vulcanized to the core and to the hard rubber base on each side of the core.

In testimony whereof, I affix my signature.

FRED D. FOWLER.